March 18, 1969        W. S. JEFFERY        3,433,603
PREVENTION OF SULFATE SCALE FORMATION
Filed July 8, 1966
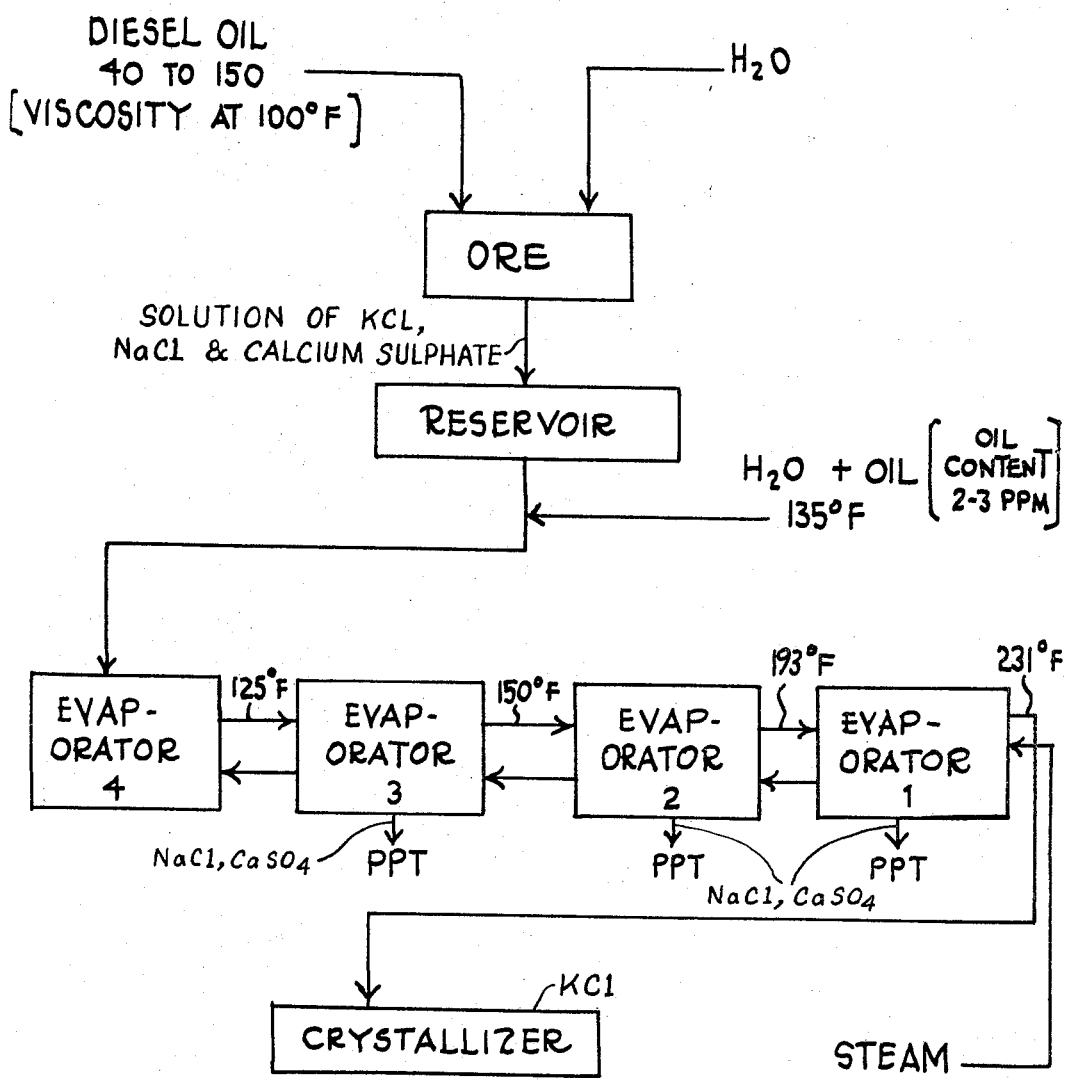
INVENTOR
WALTER S. JEFFERY
BY
ATTORNEYS United States Patent Office 3,433,603
Patented Mar. 18, 1969

3,433,603
PREVENTION OF SULFATE SCALE FORMATION
Walter S. Jeffery, Regina, Saskatchewan, Canada, assignor to Kalium Chemicals Limited, Regina, Saskatchewan, Canada, a corporation of Canada
Filed July 8, 1966, Ser. No. 563,659
U.S. Cl. 23—300    7 Claims
Int. Cl. B01d 1/10

ABSTRACT OF THE DISCLOSURE

Disclosed is a method of preventing sulfate scale on heat exchange surfaces in equipment used to concentrate aqueous KCl solutions containing NaCl and sulfates. Mineral oils and petroleum oils are disclosed for use as additive to the KCl solution being evaporated to inhibit sulfate scale on the heat exchange surfaces. Amounts range from small quantities, i.e., 1 part oil per million parts of aqueous solution up to larger quantities. Oils may be added in any quantity so long as it does not interfere with the evaporation process.

---

This invention relates to the inhibition of sulfate scale in process equipment employed in the concentration of aqueous solutions of potassium chloride. It has particular application to the inhibition of sulfate scale in the heat exchange tubes associated with evaporators.

In the recovery of potassium chloride from aqueous solutions of sodium chloride and potassium chloride, large quantities of solution are passed through concentrating equipment. Usually, a mother liquor saturated with respect to NaCl is circulated through one or more evaporators. Heat is added to the solutions to drive off water, thereby concentrating the solutions with respect to potassium chloride. These solutions usually contain significant amounts of dissolved inorganic sulfate salts notably calcium sulfate. As a solution becomes more concentrated with respect to potassium chloride; it also becomes more concentrated with respect to calcium sulfate. In a typical operation, after KCl is removed from the concentrated mother liquor, at least a portion of the KCl depleted liquor is recycled to the concentration process. Accordingly, the concentration of calcium sulfate is even further increased in the evaporators and auxiliary equipment until it exceeds the solubility limit of calcium sulfate. Calcium sulfate containing minerals then precipitate out of solution. Typically a substantial portion of these minerals adhere as scale to the surfaces of the evaporators or other process equipment. Because calcium sulfate is less soluble in water at higher temperatures, it is particularly prone to precipitate or scale out of solution in the heat exchangers associated with the evaporation vessels.

Several techniques have been suggested for reducing the scaling effect of calcium sulfate minerals. Thus, for example, a high precipitated solids content, predominantly NaCl, may be recycled through the evaporator and appurtenant heat exchangers to scour scale adhering to the metallic surfaces thereof. The percent precipitated solids employed is variable. The percents solids typically employed, based on the weight of the slurry, ranges from about 5 to about 25 percent NaCl and about ½ to about 5 percent $CaSO_4$. The tendency of precipitating calcium sulfate to form as scale on metallic surfaces may also be reduced by providing seed material to the process liquor. Thus, for example, a large surface area of calcium sulfate crystals of a stable mineral species may be maintained in the circulating evaporator liquor. Additional calcium sulfate precipitating from solution tends to form on these crystals, or as new crystals, in preference to forming on the metallic surfaces of the process equipment.

Even when the aforedescribed steps have been taken to reduce scale formation, it has been necessary to periodically empty and boil out the equipment to remove scale. Sometimes even a "boil-out" operation has been inadequate to remove sulfate scale without resorting to mechanical methods.

According to the instant invention, there is provided a simple measure which inhibits the accumulation of sulfate scale on the surfaces of evaporator equipment used to concentrate saturated sodium chloride solutions with respect to potassium chloride. In the practice of the present invention, there is established and maintained in the liquor being concentrated a small amount of a hydrocarbon oil. The improvement of this invention may be practiced either independently or in conjunction with one or more of the prior art methods of inhibiting sulfate scaling. In the preferred embodiment, a high level, e.g., about 5 to about 30 percent, based on the weight of the slurry, circulating solids is maintained in the evaporation system to which oil is provided.

In a typical KCl crystallization process, aqueous solutions containing from about 24 to about 34 pounds of NaCl and from about 8 to about 25 pounds of KCl per 100 pounds of water are fed to an evaporation zone. Although other feed compositions are within contemplation, the foregoing range of feed compositions includes most commercially significant operations. The evaporation zone usually includes a plurality of evaporators operating at distinct temperature and concentration conditions. The mother liquor circulating through each evaporator is usually saturated with respect to NaCl. The concentration of KCl and other salts, notably calcium sulfate, varies between the effects, generally increasing in the direction of flow of the mother liquor.

The hydrocarbon oil employed in the practice of this invention may be added to the mother liquor in the evaporators. It is generally more convenient, however, to mix the oil with the aqueous feed solution prior to its introduction to the evaporator zone. Preferably, the oil is mixed with the aqueous feed solutions with sufficient agitation to completely disperse the oil in the feed solution. One satisfactory method of dispersing the oil in the aqueous phase is to add the oil to the feed solution and pass the mixture through a pump. As the mixture is pumped, the pumping action serves to disperse the oil in the aqueous phase. According to a preferred embodiment, oil is added to the dissolving water used to dissolve the NaCl and KCl-containing ore in the preparation of aqueous feed for the evaporators. Following this procedure, by the time the feed solution is introduced to the evaporators, it has been subjected to considerable mixing action thereby effectively dispersing the oil.

The amount of hydrocarbon oil employed in the practice of this invention is usually not critical. Large excesses of oil may be employed provided its presence in such amounts does not hamper the process. As little as a few parts per million of the oil in the feed solution is effective, significantly reducing the incidence of sulfate scaling in a large commercial evaporator. When the mixtures of oil and aqueous solutions of this invention are vigorously agitated and allowed to stand for appreciable periods, it is found that a small amount of oil remains dispersed as a stable suspension in the aqueous phase. This quantity of oil, e.g., about 1 to about 5, rarely more than about 10 parts by weight per million is adequate for the practice of the present invention. Thus, feed solutions in which oil has once been dispersed may be stored for prolonged periods and subsequently introduced to the evaporation zone without further preparation. With greater degrees of agitation, larger amounts, e.g., 30 to 40 parts by weight per million, oil can be dispersed in aqueous feed solutions to prepare stable suspensions in which there are essentially no discrete droplets of oil visible to the naked eye. Unless discrete droplets of oil interfere with the process, e.g., by fouling heat exchangers, etc., their presence is tolerable in the practice of this invention.

Any convenient hydrocarbon oil may be employed in the practice of the invention. Cost and viscosity properties are the principal factors influencing selection of the oil employed. Crude petroleum oil is often satisfactory. Viscosities of about 40 to about 150 Saybolt seconds at 100° F. are preferred although more viscous oils are useful when the entire and with reference to the accompanying drawing process is run at suitably high temperatures. Refined fractions may be employed where justified by economics. A diesel oil cut is often preferred because of its suitable viscosity properties. In general, crude, refined or distilled petroleum or mineral oils are operable.

As a specific example of the hereindescribed process, an aqueous solution containing about 31.3 pounds of NaCl and about 12.6 pounds of KCl per 100 pounds of water was prepared by dissolving sylvinite ore in water. A diesel oil fraction with a Saybolt viscosity specification of 45 to 125 at 100° F. was added to the solvent water prior to contacting the ore therewith. The aqueous solution was forwarded to a reservoir. A feed stream containing about 2 to 3 parts by weight per million of the oil dispersed therein was fed at a temperature of about 135° F. from the reservoir to the first effect of a series of four evaporators in a commercial plant. The solution flow was countercurrent to steam flow in the evaporators such that the first and second effects operated at substantially higher temperatures than the third and fourth effects. About 20 percent by weight precipitated solids was circulated through each of the evaporators. Effluent containing about 30.6 pounds NaCl and about 17.1 pounds KCl per 100 pounds water was passed from the fourth effect evaporator to the third effect evaporator at a temperature of about 125° F. Essentially no sulfate precipitate was formed in the fourth and third effect evaporators because of their relatively low temperatures of operation and the relatively low concentrations of $CaSO_4$ in the mother liquor circulating therein. The other two evaporators operated at considerably higher temperatures. Because calcium sulfate is less soluble at higher temperatures in aqueous media and because sulfate containing recycle streams were introduced to these effects, considerable calcium sulfate precipitated in the first and second effect evaporators. The mother liquor entered the second effect evaporator at about 150° F. containing about 29.4 parts NaCl, 23.0 parts KCl and 0.64 parts calcium sulfate over per 100 parts of water. The mother liquor left the second effect evaporator at about 193° F. and entered the first effect evaporator at that temperature, containing about 26 parts NaCl, 28.4 parts KCl and 0.32 part calcium sulfate per 100 parts of water. The mother liquor left the final (first effect) evaporator at about 231° F. containing about 23.6 parts NaCl, 34.0 parts KCl and 0.21 part calcium sulfate per 100 parts of water. The underflow from the second and first effect evaporators accordingly contained considerable amounts of calcium sulfate precipitate, amounting to about 0.20 pound and about 0.14 pound, respectively, of $CaSO_4$ per 100 pounds of water in the original feed solution.

The aforedescribed evaporators were operated for in excess of a year without appreciable accumulation of sulfate scale in either the evaporator vessels or in the heat exchangers employed to heat the mother liquor circulating through the evaporators. Samples of the precipitated sulfate were periodically collected from the tailings discharge. The oil was extracted from the sulfate samples with 1,1,1,-trichloroethane solvent. The solvent was evaporated and the weight of the oil residue was determined. From these analyses it was found that appreciable amounts, ranging from about 0.04 to about 0.8 percent by weight, of oil was associated with the sulfate particles. The oil appeared to form a coating on the surface of the sulfate particles.

The effluent mother liquor from the first effect evaporator was forwarded to a crystallization zone. This process stream contained no detectable amount of oil. Accordingly, the KCl product obtained by the practice of this invention is not ordinarily contaminated with the oil provided to the evaporators.

It should be understood that the terms "sulfate scale" and "$CaSO_4$" or "calcium sulfate" are used herein and in the claims in the generic sense. Thus, it is appreciated that calcium sulfate scale may exist in a number of forms depending upon the precise conditions of temperature, pressure and composition existing in the evaporator or heat exchangers of interest. The present invention is operable under the wide range of operating conditions which affect the form of sulfate scale produced by the system. The present invention is effective in inhibiting these various forms of calcium sulfate scale including, by way of example only, syngenite ($CaSO_4 \cdot K_2SO_4 \cdot H_2O$), gypsum ($CaSO_4 \cdot 2H_2O$), polyhalite
$$(2CaSO_4 \cdot MgSO_4 \cdot K_2SO_4 \cdot 2H_2O)$$
pentasalt ($K_2SO_4 \cdot 5CaSO_4 \cdot H_2O$), glauberite
$$(Na_2SO_4 \cdot CaSA_4),$$
calcium sulfate hemihydrate ($CaSO_4 \cdot \frac{1}{2}H_2O$) and anhydrite ($CaSO_4$). This invention is particularly effective in inhibiting scaling by calcium sulfate minerals of the general formula $CaSO_4 \cdot xH_2O$ where $x$ has a valve between 0 and 2 inclusive, including fractional values.

Although this invention has been described with particular reference to specific details of certain preferred embodiments, it is not intended thereby to limit the scope of the invention to these details except insofar as they are included in the appended claims.

I claim:
1. In the evaporative concentration of aqueous solutions containing NaCl, KCl and sulfate salts wherein said solutions are subjected to indirect heat exhange by contact with heated surfaces to thereby concentrate said solutions by evaporation with respect to KCl and to precipitate NaCl and sulfate salts therefrom wherein sulfate scale normally forms on heated surfaces, the improvement comprising providing a small quantity and up to an amount which does not interfere with the evaporative concentrating process, of oil selected from the group consisting of crude, refined or distilled mineral oils and hydrocarbon oils in said aqueous solution undergoing said concentration to thereby inhibit the formation of sulfate scale in said heated surfaces.

2. The method of claim 1 wherein there is provided up to about 10 parts by weight per million hydrocarbon oil to said aqueous solution.

3. The method of claim 1 wherein the aqueous solution fed to the process equipment is saturated with respect to sodium chloride.

4. In the evaporative concentration of aqueous solutions containing NaCl, KCl and calcium sulfate where said solutions are subjected to indirect heat exchange by contact with heated surfaces to thereby concentrate said solutions by evaporation with respect to KCl and to precipitate sodium chloride and calcium sulfate therefrom wherein sulfate scale normally forms on heated surfaces, the improvement comprising providing in said solution a small quantity of from about 1 part per million up to an amount which does not interfere with the evaporative concentrating process, of an oil selected from the group consisting of crude, refined or distilled mineral oils and hydrocarbon oils to thereby inhibit the formation of calcium sulfate scale on said heated surfaces.

5. The method of claim 4 wherein an aqueous slurry containing precipitated NaCl is circulated through said process equipment.

6. The method of claim 5 wherein the aqueous slurry contains between about 5 and about 25 percent solid NaCl based on the weight of the slurry.

7. In the evaporative concentration of an aqueous solution containing KCl and saturated with respect to NaCl and $CaSO_4$ wherein said solution is subjected to indirect heat exchange by contact with heated surfaces to thereby concentrate said solution by evaporation with respect to KCl and to precipitate NaCl and $CaSO_4$ wherein sulfate scale normally forms on heated surfaces, therefrom the improvement comprising providing in said solution which contacts said surfaces a small amount from about 1 part per million to an amount which does not interfere with the evaporative concentrating process, of a member from the group consisting of crude, refined or distilled mineral oils and hydrocarbon oils to thereby inhibit the formation of sulfate scale on said heated surfaces.

References Cited

UNITED STATES PATENTS

| 3,353,927 | 11/1967 | Ralston. | |
| 3,384,459 | 5/1968 | Carter et al. | 23—303 |
| 2,482,904 | 9/1949 | Dougherty | 134—22 |
| 3,008,655 | 11/1961 | Adams et al. | 241—20 |
| 3,016,143 | 1/1962 | Trachta | 209—166 |

FOREIGN PATENTS

| 1,545 | 6/1865 | Great Britain. |

NORMAN YUDKOFF, *Primary Examiner.*

J. SOFER, *Assistant Examiner.*

U.S. Cl. X.R.

23—302; 159—47; 203—7, 68; 209—5